United States Patent
Xu et al.

(10) Patent No.: US 7,327,048 B2
(45) Date of Patent: Feb. 5, 2008

(54) HYBRID GAS TURBINE ENGINE STARTER-GENERATOR

(75) Inventors: Mingzhou Xu, Tucson, AZ (US); Michael W. Duddeck, Tucson, AZ (US); Wayne T. Pearson, Tucson, AZ (US); William M. Scherzinger, Tucson, AZ (US); David E. Stout, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/443,855

(22) Filed: May 30, 2006

(65) Prior Publication Data

US 2006/0214427 A1    Sep. 28, 2006

Related U.S. Application Data

(62) Division of application No. 10/920,814, filed on Aug. 17, 2004, now Pat. No. 7,078,826.

(51) Int. Cl.
*F01D 15/10* (2006.01)

(52) U.S. Cl. .................. 290/52; 290/1 R; 290/40 C (58) Field of Classification Search ............. 290/52, 290/40 C, 1 R
See application file for complete search history.

(56) References Cited

U.S. PATENT DOCUMENTS

| | | | |
|---|---|---|---|
| 599,932 | A | 3/1898 | Frankenfield et al. |
| 2,726,361 | A | 12/1955 | Ringland |
| 3,378,755 | A | 4/1968 | Sawyer |
| 3,619,746 | A | 11/1971 | Thornton et al. |
| 3,771,046 | A | 11/1973 | Harter |
| 4,072,880 | A | 2/1978 | Oshima et al. |
| 4,459,532 | A | 7/1984 | Schutten et al. |
| 4,547,689 | A | 10/1985 | Tsuchimoto et al. |
| 4,675,591 | A | 6/1987 | Pleiss |
| 4,786,853 | A | 11/1988 | VanMaaren |
| 4,939,441 | A | 7/1990 | Dhyanchand |
| 5,068,590 | A | 11/1991 | Glennon et al. |
| 5,103,153 | A | 4/1992 | Droho |
| 5,309,029 | A | * | 5/1994 | Gregory et al. ............. 290/1 R |

(Continued)

FOREIGN PATENT DOCUMENTS

| | | |
|---|---|---|
| FR | 2744297 | 8/1997 |
| GB | 1523467 | 8/1978 |

OTHER PUBLICATIONS

PCT International Search Report PCT/US2005/029143, dated Feb. 21, 2007.

*Primary Examiner*—Darren Schuberg
*Assistant Examiner*—Iraj A. Mohandesi
(74) *Attorney, Agent, or Firm*—Ingrassia Fisher & Lorenz (57) ABSTRACT

A rotating electrical machine, such as an aircraft starter-generator, that may be operated in either a DC motor mode or an AC generator mode. The machine includes a conventionally wound main stator that is selectively configurable as a multi-pole AC stator and a multi-pole DC stator. The machine also includes rotor windings that are configured to be selectively coupled to either an exciter or a plurality of commutator segments, and DC brushes that are selectively moveable into, and out of, electrical contact with the commutator segments, to thereby electrically couple and decouple a DC power source to and from, respectively, the rotor windings.

13 Claims, 12 Drawing Sheets

U.S. PATENT DOCUMENTS

| | | |
|---|---|---|
| 5,418,436 A | 5/1995 | Apuzzo |
| 5,428,275 A | 6/1995 | Carr et al. |
| 5,455,885 A | 10/1995 | Cameron |
| 5,513,719 A * | 5/1996 | Moroto et al. ............. 180/65.4 |
| 5,537,020 A | 7/1996 | Couture et al. |
| 5,546,742 A | 8/1996 | Shekhawat et al. |
| 5,594,322 A | 1/1997 | Rozman et al. |
| 5,650,707 A | 7/1997 | Lipo et al. |
| 5,838,085 A | 11/1998 | Roesel, Jr. et al. |
| 5,929,611 A | 7/1999 | Scott et al. |
| 6,025,693 A | 2/2000 | Smith |
| 6,028,499 A * | 2/2000 | Oudet et al. ................. 335/220 |
| 6,034,511 A | 3/2000 | Scott et al. |
| RE36,678 E * | 5/2000 | Moroto et al. ............. 180/65.4 |
| 6,093,975 A * | 7/2000 | Peticolas ..................... 290/52 |
| 6,724,099 B2 * | 4/2004 | Klaar ......................... 290/52 |
| 6,737,836 B2 | 5/2004 | Namai |
| 6,825,575 B1 * | 11/2004 | Edelson .................... 290/40 C |
| 2001/0033116 A1 | 10/2001 | Rose, Sr. |
| 2004/0027077 A1 | 2/2004 | Xu et al. |
| 2004/0150232 A1 | 8/2004 | Xu et al. |

* cited by examiner

HYBRID GAS TURBINE ENGINE STARTER-GENERATOR

CROSS-REFERENCE TO RELATED APPLICATION

This application is a divisional of application Ser. No. 10/920,814 filed Aug. 17, 2004 now U.S. Pat. No. 7,078,826.

TECHNICAL FIELD

The present invention relates to rotating electrical machines such as starter-generators for gas turbine engines and, more particularly, to a hybrid starter-generator that is selectively convertible between operation as an AC generator and a DC motor.

BACKGROUND

An aircraft may include various types of rotating electrical machines such as, for example, generators, motors, and motor/generators. Motor/generators are used as starter-generators in some aircraft, since this type of rotating electrical machine may be operated in both a motor mode and a generator mode. A starter-generator may be used to start the engines or auxiliary power unit (APU) of an aircraft when operating as a motor, and to supply electrical power to the aircraft power distribution system when operating as a generator. Thus, when operating as a motor, a starter-generator may be designed to supply mechanical output torque sufficient to start the engines.

One particular type of aircraft starter-generator includes three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating in a generator mode. Conversely, if the starter-generator is operating in a motor mode, the control device supplies AC power.

If the starter-generator is operating in the generator mode, DC current from the regulator or control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating in the motor mode, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

The above-described starter-generator may include relatively complex and heavy power electronics circuits in the control device. For example, some control devices may include inverters, for converting DC to AC power, rectifiers, for converting AC power to DC power, and potentially complex voltage and frequency control circuits. Although brush-type DC machines may alleviate the need for some of these complex and heavy electronic circuits, these also suffer certain drawbacks. For example, the brushes tend to wear fairly quickly, reducing machine reliability, and increasing the need for periodic maintenance and cleaning.

One prior approach to addressing the above-mentioned drawbacks was developed by some of the inventors of the present invention. The prior approach, disclosed in U.S. patent application Ser. No. 10/xxx,xxx, entitled "Gas Turbine Engine Starter Generator with AC Generator and DC Motor Modes," and assigned to the assignee of the instant application, provides a specially wound main stator that can be selectively configured as either a multi-pole AC stator or a multi-pole DC stator. Although this prior approach addresses the noted drawbacks, it too presents certain drawbacks. In particular, the specially wound main stator, which includes additional segments and windings, is more complex than a conventionally wound stator, which can increase overall costs, and adversely affects power quality when operating in the generator mode.

Hence, there is a need for a starter-generator that does not rely on relatively complex and heavy inverters and frequency control circuits for proper operation, and/or does not suffer reduced reliability from brush wear, and/or the need for potentially frequent maintenance and cleaning and/or does not use a specially wound stator. The present invention addresses one or more of these needs.

BRIEF SUMMARY

The present invention provides a starter-generator that does not incorporate relatively complex power conversion and frequency control circuits, which reduces the weight and cost as compared to some current starter-generators, that may increase the wear life of the DC brushes, which reduces the need for cleaning and maintenance, and that does not rely on a specially wound stator.

In one embodiment, and by way of example only, a gas turbine engine starter-generator includes a housing, a main rotor, a main stator, two or more brushes, and one or more stator switches. The main rotor is rotationally mounted within the housing. The main stator is mounted within the housing and at least partially surrounds at least a portion of the main rotor. The main stator is selectively configurable as an M-pole AC stator and an N-pole DC stator, where M and N are each integers greater than one. The brushes are adapted to electrically couple to a DC power source and are selectively movable into, and out of, electrical contact with at least a portion of the main rotor. The stator switches are configured to selectively electrically couple the main stator to the DC power source and to at least two of the brushes.

In another exemplary embodiment, a gas turbine engine starter-generator includes a housing, a main rotor, a main stator, two or more brushes, one or more stator switches, and one or more rotor switches. The main rotor is rotationally mounted within the housing. The main stator is mounted within the housing and at least partially surrounds at least a portion of the main rotor. The main stator is selectively configurable as an M-pole AC stator and an N-pole DC stator, where M and N are each integers greater than one. The brushes are adapted to electrically couple to a DC power source and are selectively movable into, and out of, electrical contact with at least a portion of the main rotor. The stator switches are configured to selectively electrically couple the main stator to the DC power source and to at least two of the brushes. The rotor switches are configured to selectively electrically couple the main rotor to the DC power source.

In still a further exemplary embodiment, a rotor includes a shaft, a plurality of poles extending radially from the shaft, and a plurality of rotor windings wound around the plurality of poles in a configuration that allows the rotor windings to be electrically coupled to one of two DC power sources.

Other independent features and advantages of the preferred starter-generator will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
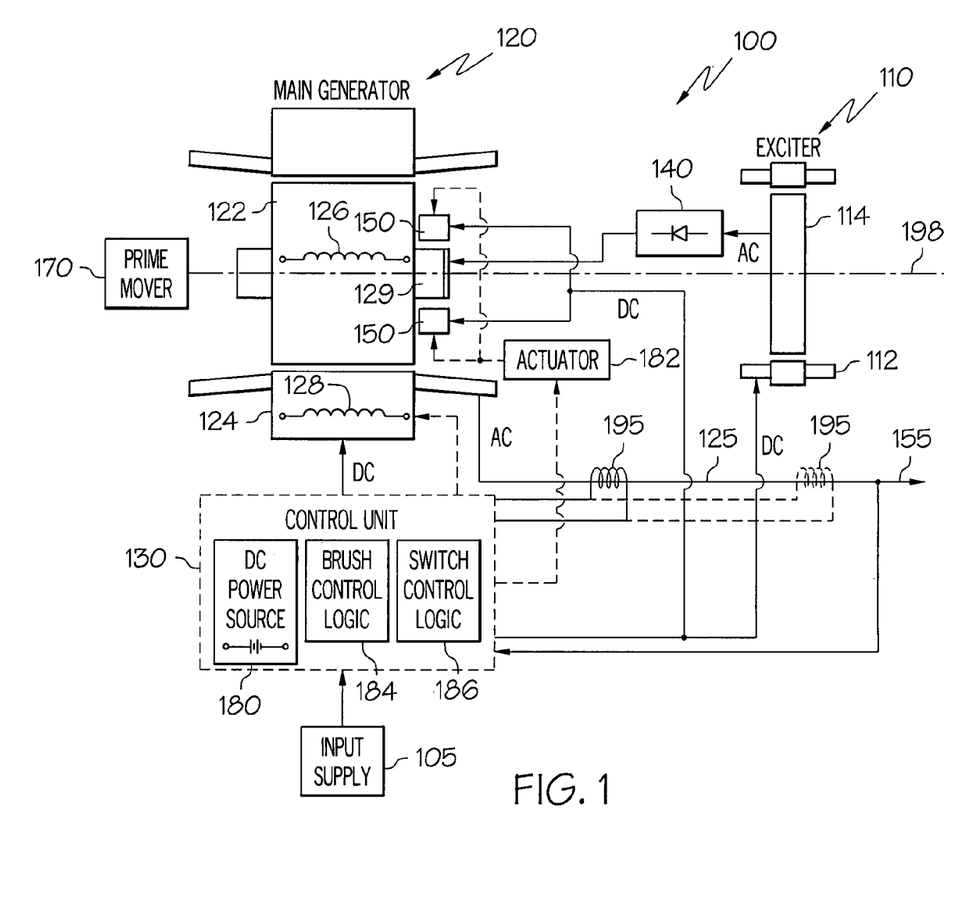
FIG. 1 is a simplified schematic block diagram of an exemplary high speed starter-generator system according to an embodiment of the invention.

A functional schematic block diagram of one embodiment of a high speed motor/generator system 100 is shown in FIG. 1. This exemplary motor/generator system 100 includes an exciter 110, a main motor/generator 120, a motor/generator control unit 130, one or more rectifier assemblies 140, and one or more pairs of brushes 150. It is noted that the motor/generator system 100 may be used as a starter-generator, operable at various speeds, for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating in a generator mode, a stator 124 of the main motor/generator 120, as will be described more fully below, is configured as a multi-pole AC stator, and the brushes 150 are preferably moved out of physical contact with a main motor/generator rotor 122. The motor/generator control unit 130, which is coupled to receive power from an input supply source 105, supplies controllable DC power to a stator 112 of the exciter 110, but is configured so that DC power is not supplied to the main stator 124. A prime mover 170 such as, for example, a gas turbine engine, rotates both a rotor 114 of the exciter 110 and the main motor/generator rotor 122. As the exciter rotor 114 rotates, it generates and supplies AC power to the rectifier assemblies 140. The output from the rectifier assemblies 140 is DC power and is supplied to rotor windings 126 wound on the main motor/generator rotor 122. As a result, AC power is output from stator windings 128 wound on the main motor/generator stator 124. Though not depicted in FIG. 1, it will be appreciated that DC power can be obtained from the AC power output from the motor/generator system 100, if so desired, by including one or more rectifiers.

During its operation in the generator mode, the motor/generator system 100 is capable of supplying output power at a variety of frequencies. Alternatively, a gearing system may be used to operate the motor/generator at a constant speed and, thus, supply a constant frequency. The output power from the main motor/generator stator 124 is typically three-phase AC power. One or more stator output leads 125 supplies the generated AC power to external systems and equipment via one or more terminal assemblies 155. The motor/generator control unit 130 can regulate the power output based upon monitoring signals provided to it from monitoring devices 195. In the depicted embodiment, the exciter 110 and the main motor/generator 120 both rotate along a single axis 198 at the same rotational speed. It will be appreciated, however, that in other embodiments the exciter 110 may rotate along a different axis. Moreover, the relative positioning of the exciter 110 and the main motor/generator 120 can be modified in different embodiments such that the exciter 110 is physically located on the other side of the main motor/generator 120.

When the motor/generator system 100 is operating in a motor mode, the main motor/generator stator 124 is configured as a multi-pole DC stator, the brushes 150 are moved into physical contact with the main motor/generator rotor 122, and the main motor/generator rotor 122 is electrically disconnected from the rectifier assemblies 140. A DC power source 180, which is electrically coupled to the brushes 150 (this connection is not shown in FIG. 1), supplies DC power to the main motor/generator rotor windings 126, via a commutator 129. The commutator 129, as is generally known, and as will be described more fully below, alternates the polarity of opposing rotor poles. The control unit 130 is additionally configured to supply DC power to the main motor/generator stator windings 128, and no longer supply the controllable DC power to the exciter stator 112. It should be appreciated that the DC power that is supplied to the main motor/generator stator windings 128 is preferably the same DC power source 180 that supplies the brushes 150, though it will be appreciated that it could be a separate DC power source. In any case, as a result of this configuration, the main motor/generator rotor 122 is rotated, supplying rotational power to, for example, the gas turbine engine 170.

Figure 2:
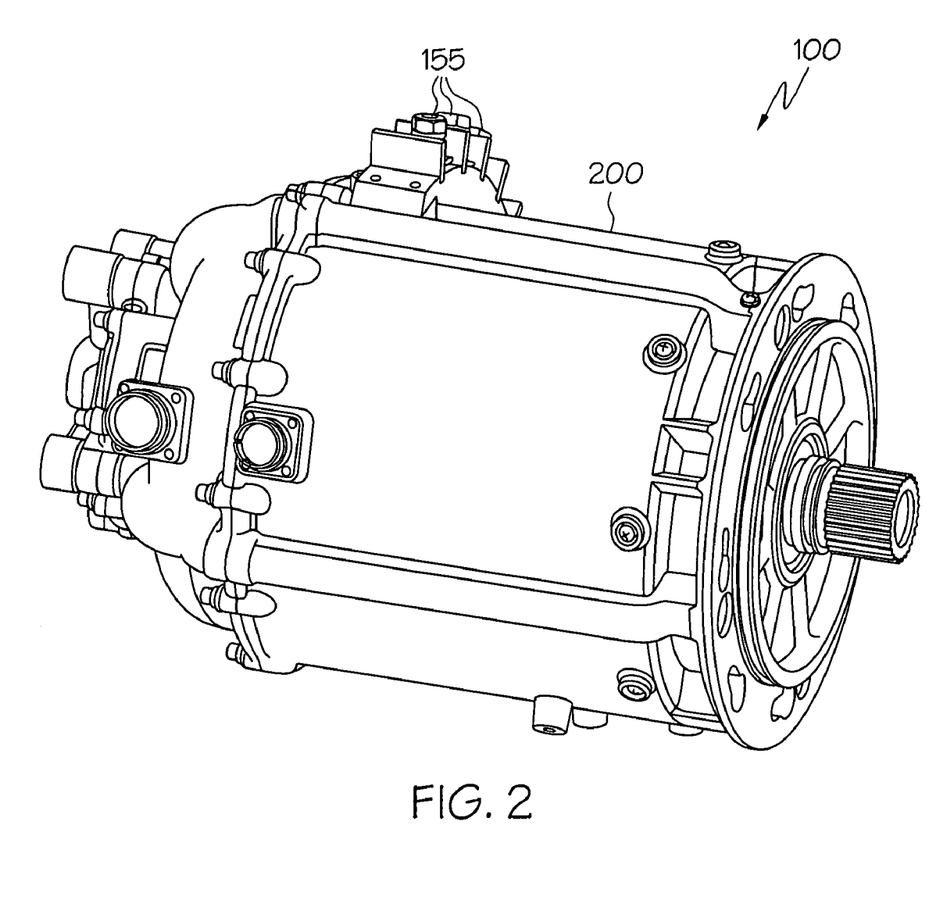
FIG. 2 is a perspective view of a physical embodiment of the starter-generator system depicted in FIG. 1.

In the depicted embodiment, the brushes 150 are moved in to, and out of, contact with the main motor/generator rotor 122 using one or more actuators 182 such as, for example, one or more solenoids. The actuators 182 are controlled using, for example, brush control logic 184. In the depicted embodiment, the brush control logic 184 is located in the control unit 130, though it will be appreciated that it could be located elsewhere. A perspective view of an exemplary physical embodiment of at least those portions of the motor/generator system 100 that are mounted within a housing 200 is illustrated in FIG. 2.

Figure 3:
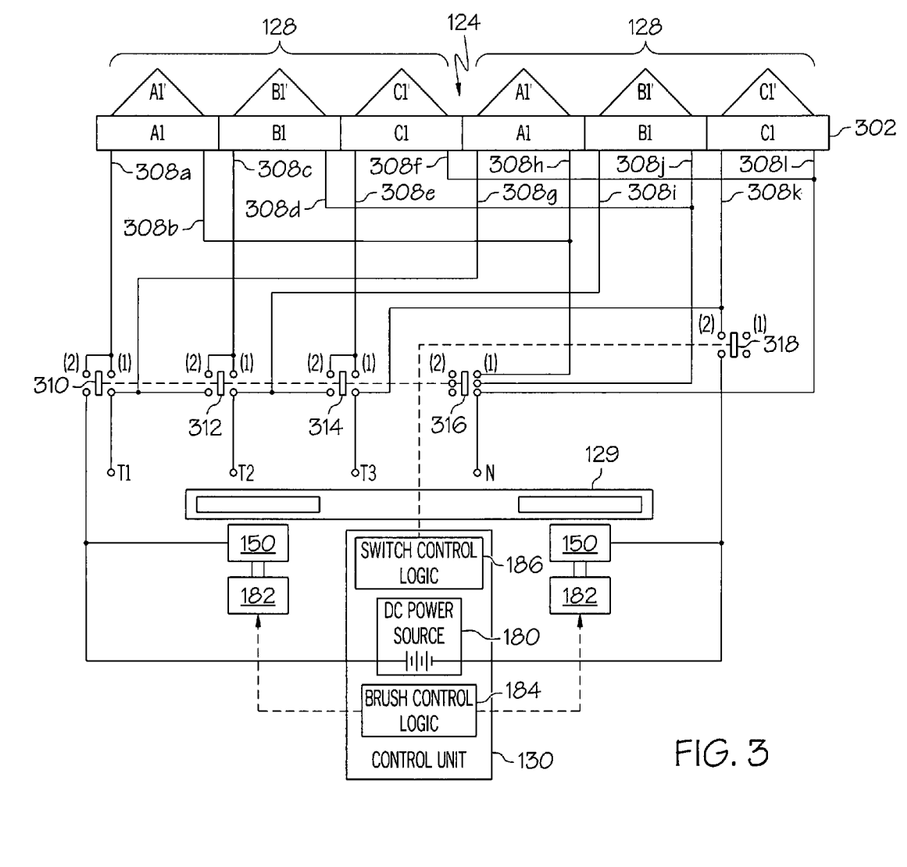
FIG. 3 is simplified representation of a main stator that may be used in the starter-generator of FIGS. 1 and 2, which schematically depicts various switched interconnections between stator winding segments according to an exemplary embodiment of the present invention.

Turning now to FIG. 3, a simplified representation of an exemplary embodiment of the main motor/generator stator 124, and portions of the main motor/generator rotor 122, schematically depicting various switched interconnections between stator winding segments and portions of the rotor 122 is shown. It will be appreciated that the stator 124 is typically cylindrical in shape; however, for clarity and ease of explanation, it is shown in a flat, linear configuration. The stator 124 includes a main body (or core) 302, around which the stator windings 128 are wound. The stator core 302 is formed by a plurality of stator lamination sections A1, B1, C1, A2, B2, C2, each of which includes one or more slots (not illustrated). The stator windings 128 are wound around the stator core 302 by inserting a portion of each winding into, and through, the slots in each stator sections A1, B1, C1, A2, B2, C2, thereby forming six stator winding circuits A1', B1', C1', A2', B2', C2'. The stator winding circuits A1', B1', C1', A2', B2', C2' are then electrically coupled, as described more fully below, to generate desired magnetic field polarities when current flows through the stator windings 128. It is noted that, for clarity, each winding circuit A1', B1', C1', A2', B2', C2' is represented using only a single winding 128 inserted through each stator section A1, B1, C1, A2, B2, C2. However, it will be appreciated that more than one stator winding 128 may be inserted through each stator section A1, B1, C1, A2, B2, C2, and electrically coupled together to form each of the winding circuits A1', B1', C1', A2', B2', C2'.

At least two conductor lead 308*a-l* extend from each of the stator sections A1, B1, C1, A2, B2, C2, for a total of twelve leads. Each lead 308*a-l* is electrically coupled to each of the stator windings 128 that extend through the respective stator section A1, B1, C1, A2, B2, C2 from which each lead 308*a-l* extends. Three of the leads 308*a*, 308*c*, 308*e* are selectively electrically coupled to one of three terminals T1, T2, T3, which are in turn electrically coupled to the above-referenced output leads 125 (not shown in FIG. 3). A plurality of controllable stator switches 310-318 are electrically coupled to selectively interconnect various ones of the leads 308*a-l*, and to selectively couple two of the leads 308*a* and 308*k* to the DC power source 180. In the depicted embodiment, the stator switches 310-318 each have at least two positions, a first position (1) and a second position (2). In FIG. 3, however, the stator switches 310-318 are each shown in a transition state between the first and second positions. It will be appreciated that the stator switches 310-318 may be physically separate switches or different poles of a single switch. In the depicted embodiment, the stator switches 310-318 are each remotely controlled by switch control logic 186, which may be located in the control unit 130. However, it will additionally be appreciated that the switch control logic 186 may be located elsewhere. It should further be appreciated that the stator switches 310-318 may be any one of numerous controllable switch types including, but not limited to, mechanical switches, relays, and various types of transistors. Moreover, it should be appreciated that the stator switches 310-318 may be physically located within the controller 130 or external thereto, as shown in FIG. 3.

With continued reference to FIG. 3, it is seen that the DC power source 180 is also electrically coupled to the DC brushes 150. As was previously noted, the DC brushes 150 are selectively moved in to, and out of, contact with the commutator 129 via one or more brush actuators 182 (not shown in FIG. 3), which are controlled by the brush control logic 184 (also not shown in FIG. 3). As will be described in more detail further below, when the motor/generator system 100 is configured to operate in the generator mode, the brush actuators 182 move the DC brushes 150 out of contact with the commutator 129. Conversely, when the motor/generator system 100 is configured to operate in the motor mode, the brush actuators 182 move the DC brushes 150 into contact with the commutator 129.

Figure 4:
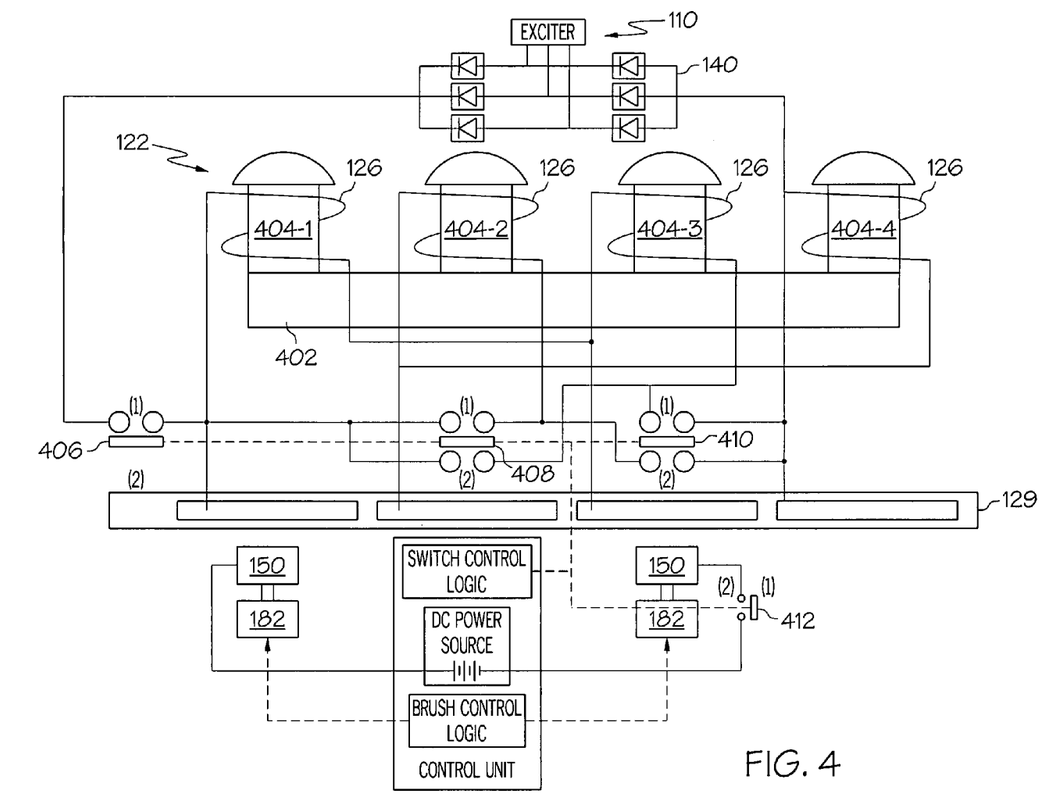
FIG. 4 is simplified representation of a main rotor that may be used in the starter-generator of FIGS. 1 and 2, which schematically depicts various switched interconnections between rotor windings according to an exemplary embodiment of the present invention.

With reference now to FIG. 4, a simplified representation of an exemplary embodiment of the main motor/generator rotor 122, schematically depicting various switched interconnections between rotor windings and the rectifier assemblies 140 is shown. The rotor 122, as may be appreciated, typically has a substantially cylindrical overall space envelope. However, as with the stator 124 configuration described above, for clarity and ease of explanation, the rotor 122 is shown in a flat, linear configuration. The rotor 122 includes a main shaft 402, and a plurality of poles 404 (e.g., 404-1, 404-2, 404-3, 404-4) that extend radially therefrom. The rotor windings 126 are wound around the rotor poles 404, and are electrically coupled to receive DC power from either the exciter 110, via the rectifier assemblies 140, or the DC power source 180, via the commutator 129. The rotor windings 126, as will be described more fully further below, are electrically coupled to generate desired magnetic field polarities in the rotor poles 404, depending on whether the main motor/generator 120 is configured to operate in the motor or generator mode.

As with the stator 124, the rotor 122 also includes a plurality of controllable rotor switches 406, 408, 410, 412 to selectively electrically interconnect the rotor windings 126 in a desired configuration, and to couple to rotor windings 126 to either the rectifier assemblies 140 or the commutator 129. In the depicted embodiment, the rotor switches 406-412, similar to the stator switches 310-318, each have at least two positions, a first position (1) and a second position (2). In FIG. 4, however, the rotor switches 406-412 are each shown in a transition state between the first and second positions. It will be appreciated that the rotor switches 406-412 may be physically separate switches or different poles of a single switch. In the depicted embodiment, the switches 406-412 are each remotely controlled by the same switch control logic 186 that controls the stator switches 310-318. However, it will additionally be appreciated that the rotor switches 406-412 may be controlled by separate switch control logic (not depicted). It should further be appreciated that the rotor switches 406-412 may be any one of numerous controllable switch types including, but not limited to, mechanical switches, relays, and various types of transistors. Moreover, it should be appreciated that the rotor switches 406-412 may be physically located within the controller 130 or external thereto, as shown in FIG. 4.

With the above-described electrical interconnection schemes, the depicted main motor/generator 120 may be selectively configured as either a 4-pole AC generator or a 2-pole DC motor. The specific electrical interconnections for these two different configurations will now be described. Before doing so, however, it is to be appreciated that the stator and rotor structure and associated electrical interconnection schemes depicted and described are merely exemplary of one that may be used to provide a hybrid 4-pole AC/2-pole DC generator/motor combination, and that the stator and rotor structures and electrical interconnection schemes can be modified to provide any one of numerous hybrid M-pole AC/N-pole DC generator/motor combinations.

Figure 5:
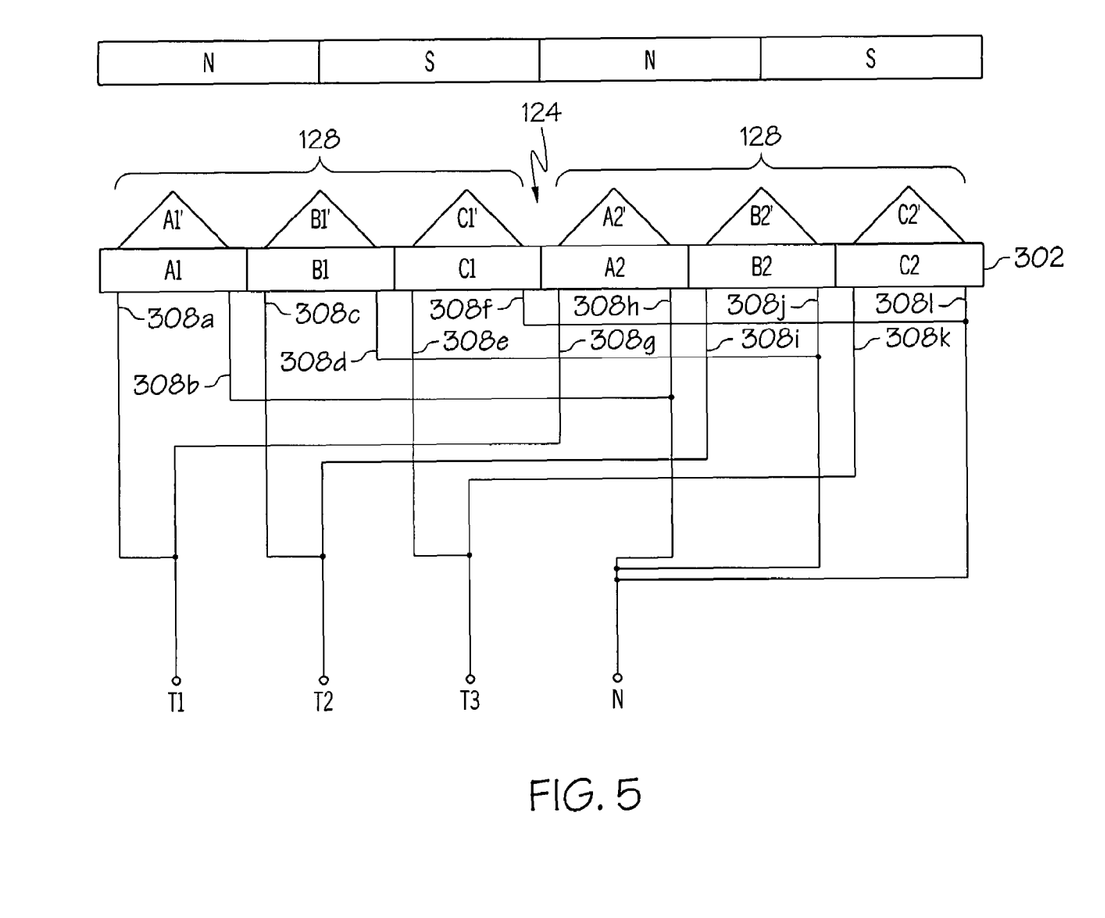
FIG. 5 is a simplified representation of the main stator, similar to that shown in FIG. 3, with the stator windings electrically connected so that the main stator is configured as a multi-pole AC generator stator.
Figure 6:
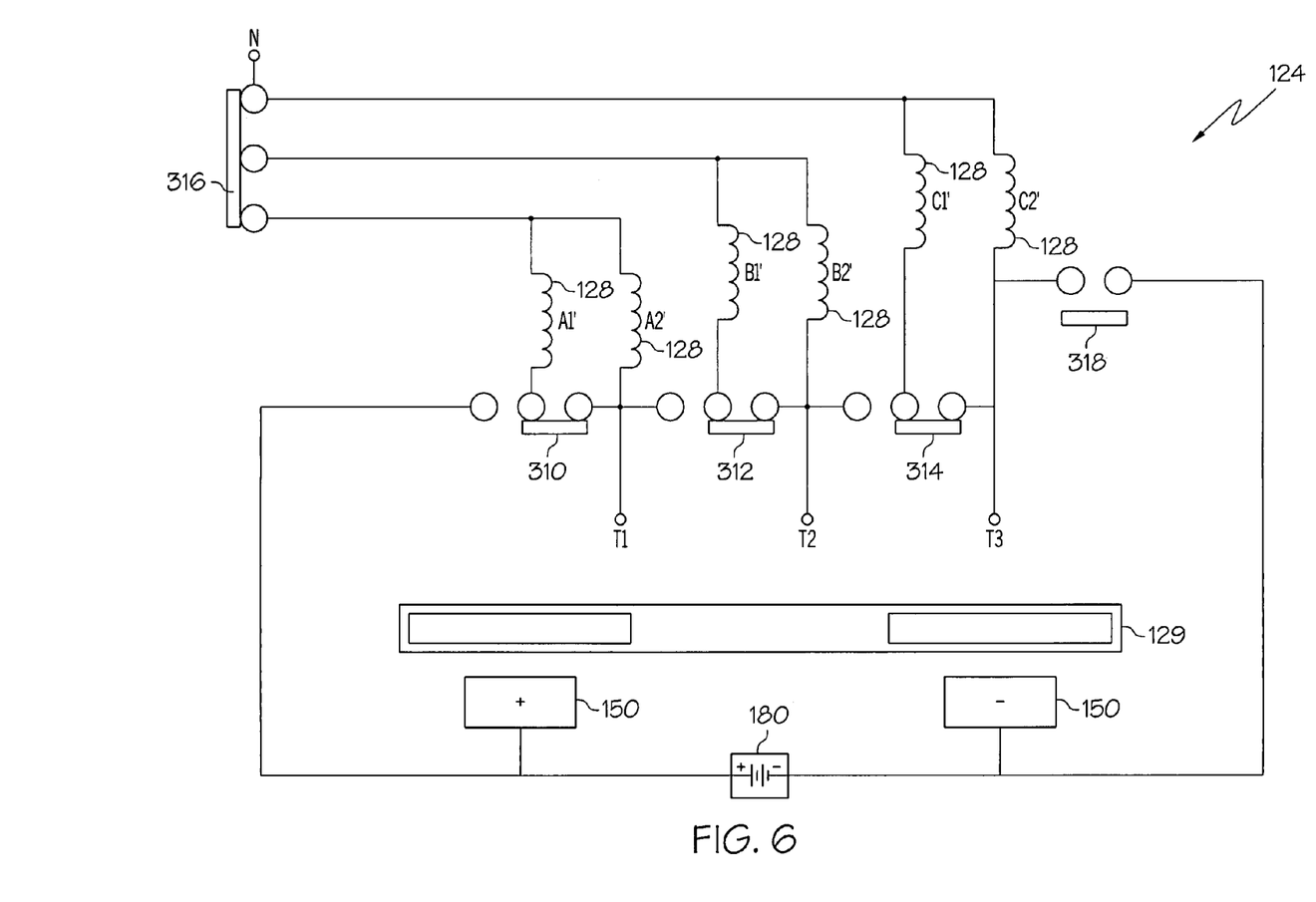
FIG. 6 is a schematic diagram of the main stator windings when configured as a multi-pole AC generator stator.
Figure 7:
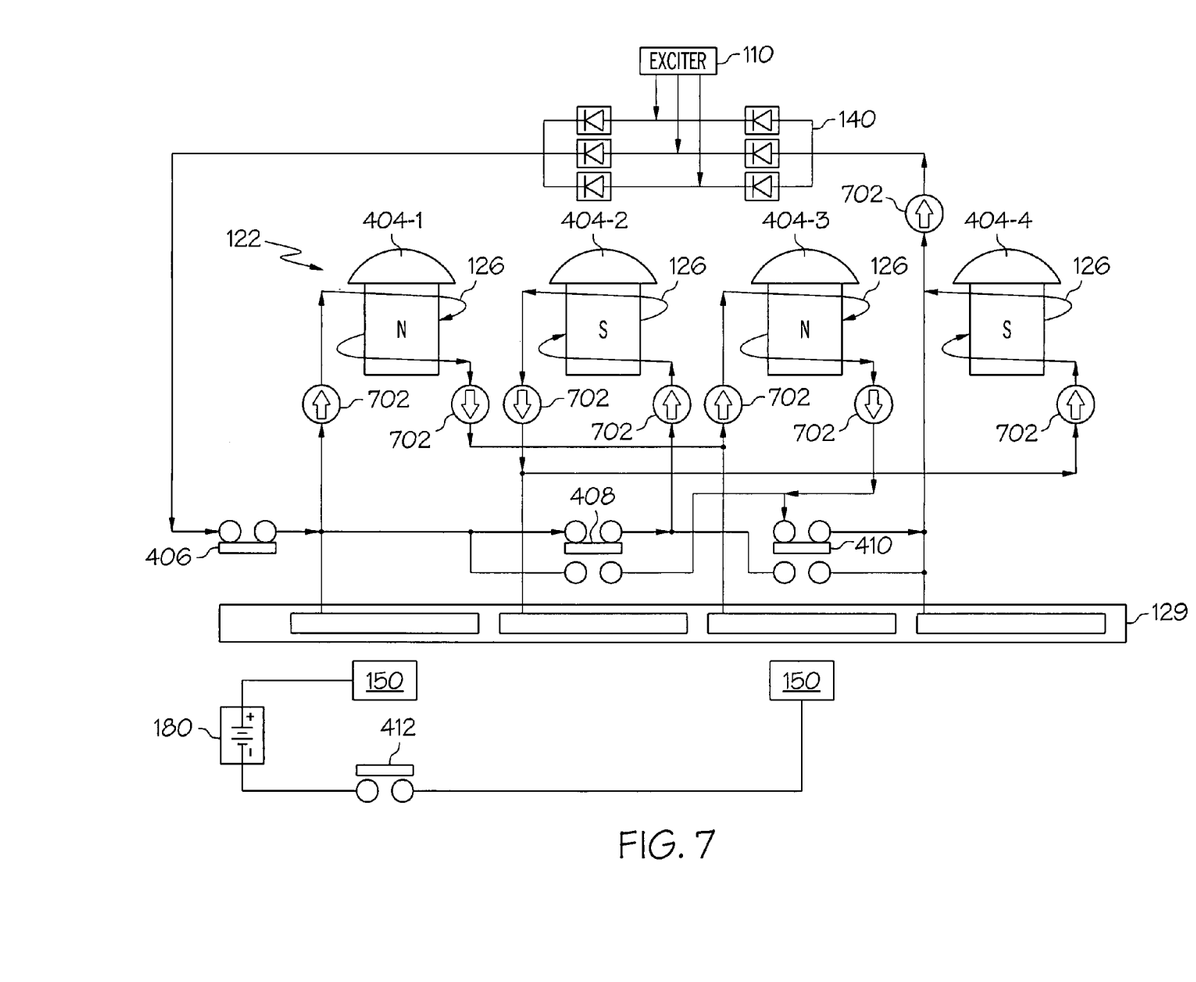
FIG. 7 is a simplified representation of the main rotor, similar to that shown in FIG. 4, with the rotor windings electrically connected so that the main rotor is configured as a multi-pole AC generator rotor.

Referring now to FIGS. 5-7, the specific electrical interconnections when the main motor/generator 120 is configured to operate in the generator mode will first be described. In the generator mode, each of the stator switches 310-318, and each of the rotor switches 406-412, is moved to the first position (1). In addition, the brush actuators 182 move the brushes 150 out of contact with the commutator 129. As is shown in FIGS. 5 and 6, when each of the stator switches 310-318 (for clarity, not shown in FIG. 5) is moved to the first position (1), the stator 124 is configured as a 4-pole AC stator. Specifically, as is shown most clearly in FIG. 6, the stator windings 128 are electrically coupled together in a 3-phase, wye (3Ø-Y) configuration, such that each phase includes two stator winding circuits electrically coupled in parallel. More specifically, one phase includes stator winding circuits A1' and A2' electrically coupled in parallel, a second phase includes winding circuits B1' and B2' electrically coupled in parallel, and a third includes winding circuits C1' and C2' electrically coupled in parallel. In addition, stator switches 310 and 318 are positioned such that the DC power source 180 is not connected to the stator 124.

Turning to FIG. 7, when each of the rotor switches 406-412 is moved to the first position (1), the rotor 122 is configured as a conventional AC generator rotor. Specifically, rotor switches 406 and 412 are positioned such that the rotor 122 is electrically connected to the rectifier assemblies 140 and is electrically disconnected from the DC power source 180. Thus, in the generator mode, excitation current for the rotor windings 126 is supplied from the exciter 110. Moreover, rotor switches 408 and 410 are positioned such that the rotor windings 126 wound around the first 404-1 and third 404-3 rotor poles are electrically coupled in series with one another, and are electrically coupled in parallel with the windings 126 that are wound around the second 404-2 and fourth 404-4 rotor poles, which are also electrically coupled in series with one another.

Thus, as FIG. 7 additionally shows, in the generator mode the DC current supplied to the rotor windings 126, which is shown using current flow arrows 702, induces two magnetic pole pairs in the rotor 122. The first 404-1 and second 404-2 poles constitute one pole pair, and the third 404-3 and fourth 404-4 poles constitute the second pole pair. As the rotor 122 rotates, AC current is induced in the stator windings 128 (shown schematically in FIG. 7). As shown in FIG. 5, the induced AC current in turn induces two magnetic pole pairs in the stator 124. The induced AC currents may also be supplied to a load, via the output leads 125, and may also, as was previously mentioned, be rectified and supplied as DC current to one or more loads.

Figure 8:
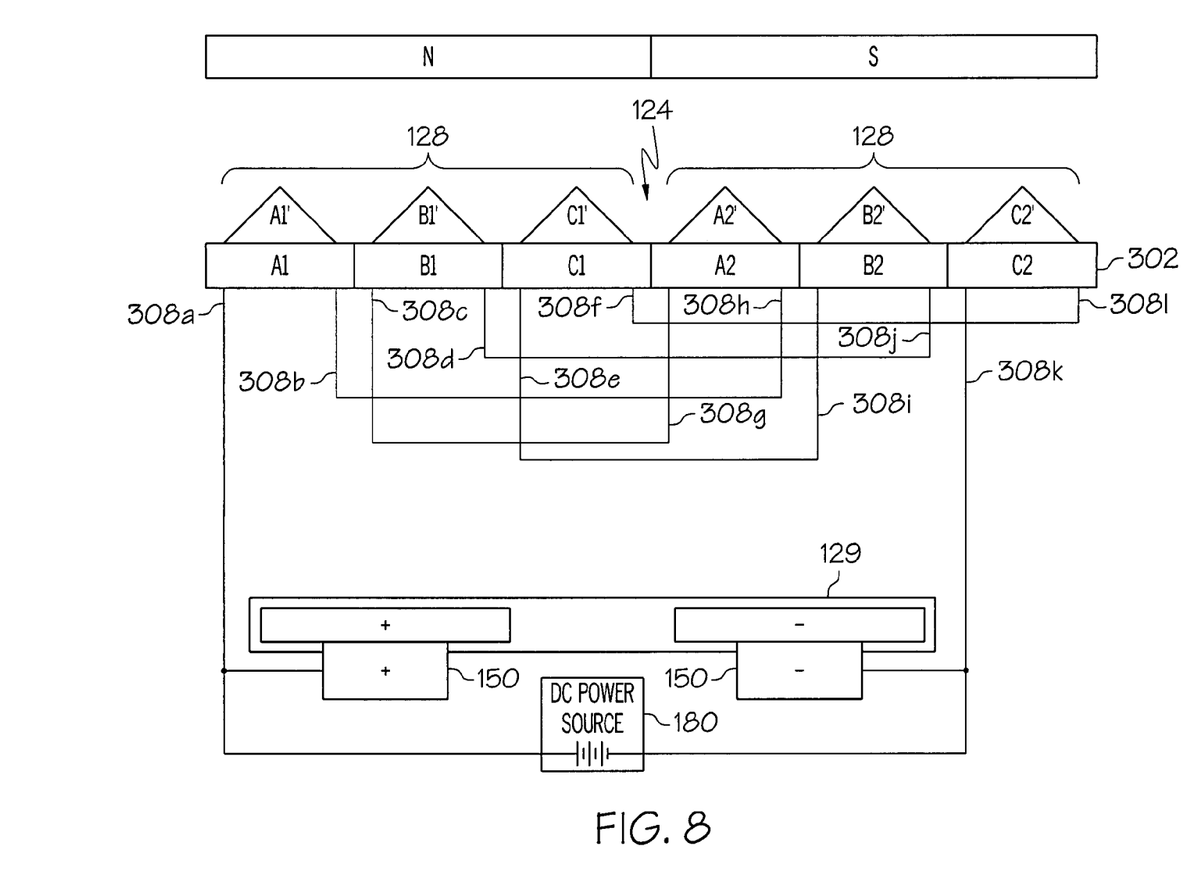
FIG. 8 is a simplified representation of the main stator, similar to that shown in FIG. 3, with the stator windings electrically connected so that the main stator is configured as a multi-pole DC motor stator.
Figure 9:
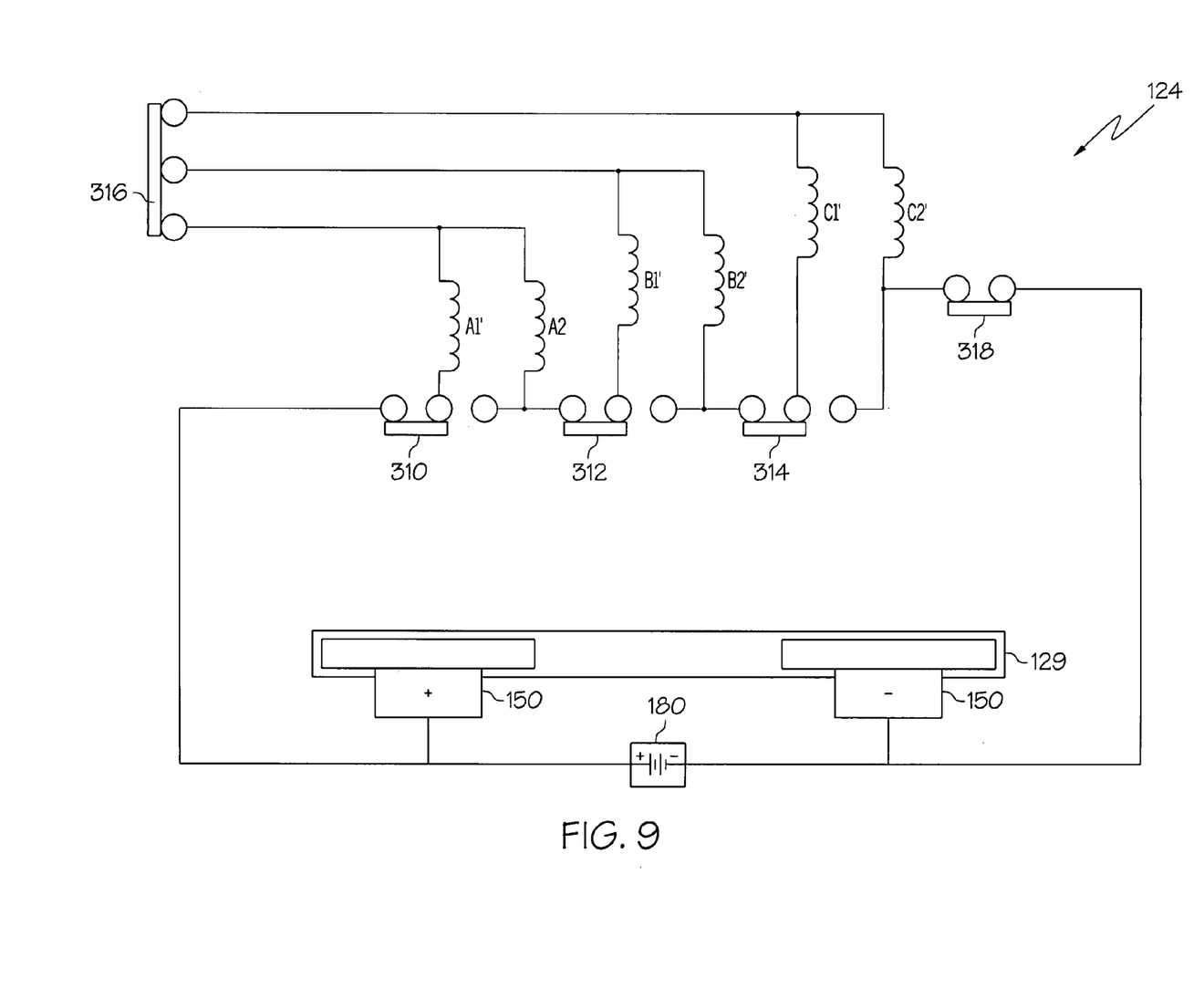
FIG. 9 is a schematic diagram of the main stator windings when configured as a multi-pole DC motor stator.

Turning to FIGS. 8-12, the specific electrical interconnections when the main motor/generator 120 is configured to operate in the motor mode will now be described. In the motor mode, each of the stator switches 310-318, and each of the rotor switches 406-412, is moved to the second position (2). In addition, the brush actuators 182 move the brushes 150 into contact with the commutator 129. In FIG. 8, it is seen that when each of the stator switches 310-318 (for clarity, not shown in FIG. 8) is moved to the second position (2), the stator 124 is configured as a 2-pole DC stator. Specifically, the stator windings 128 are electrically coupled in series with one another and with the DC power source 180. More specifically, the stator windings 128 are electrically coupled such that the stator winding circuits associated with each phase are electrically connected in series. In particular, as shown most clearly in FIG. 9, the winding circuits A1' and A2' are directly connected in series, winding circuits B1' and B2' are directly connected in series, and winding circuits C1' and C2' are directly connected in series.

Figure 10:
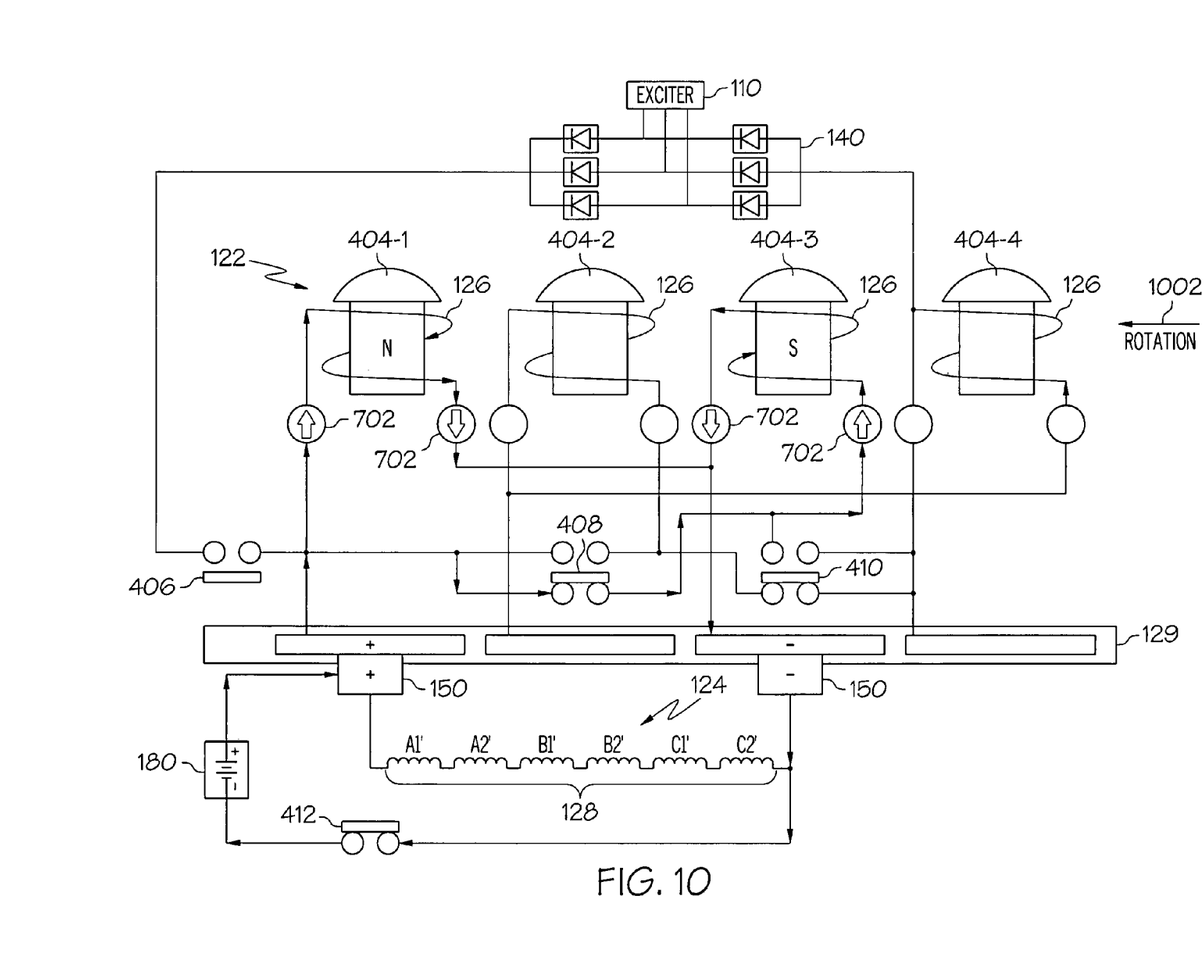
FIGS. 10-12 are simplified representations of the main rotor, similar to that shown in FIG. 4, with the rotor windings electrically connected so that the main rotor is configured as a multi-pole DC motor rotor.

When the rotor switches 406-412 are moved to the second position (2), as shown in FIG. 10, the rotor windings 126 are electrically disconnected from rectifier assemblies 140, and the DC power source 180 is electrically coupled to the brushes 150. As was noted above, the brushes 150 are in contact with the commutator 129, which is in turn electrically coupled to the rotor windings 126. The rotor switches 408 and 410 are positioned such that the rotor windings 126 wound around the first 404-1 and third 404-3 poles are electrically connected in parallel with one another and configured such that when current flows through the respective windings 126 wound thereon a single magnetic pole pair is induced in the first 404-1 and third 404-3 poles. Similarly, the rotor windings 126 wound around the second 404-2 and fourth 404-4 rotor poles are electrically connected in parallel with one another such that when current flows through the respective windings 126 wound thereon a single magnetic pole pair is induced in the second 404-2 and fourth 404-4 poles.

Figure 11:
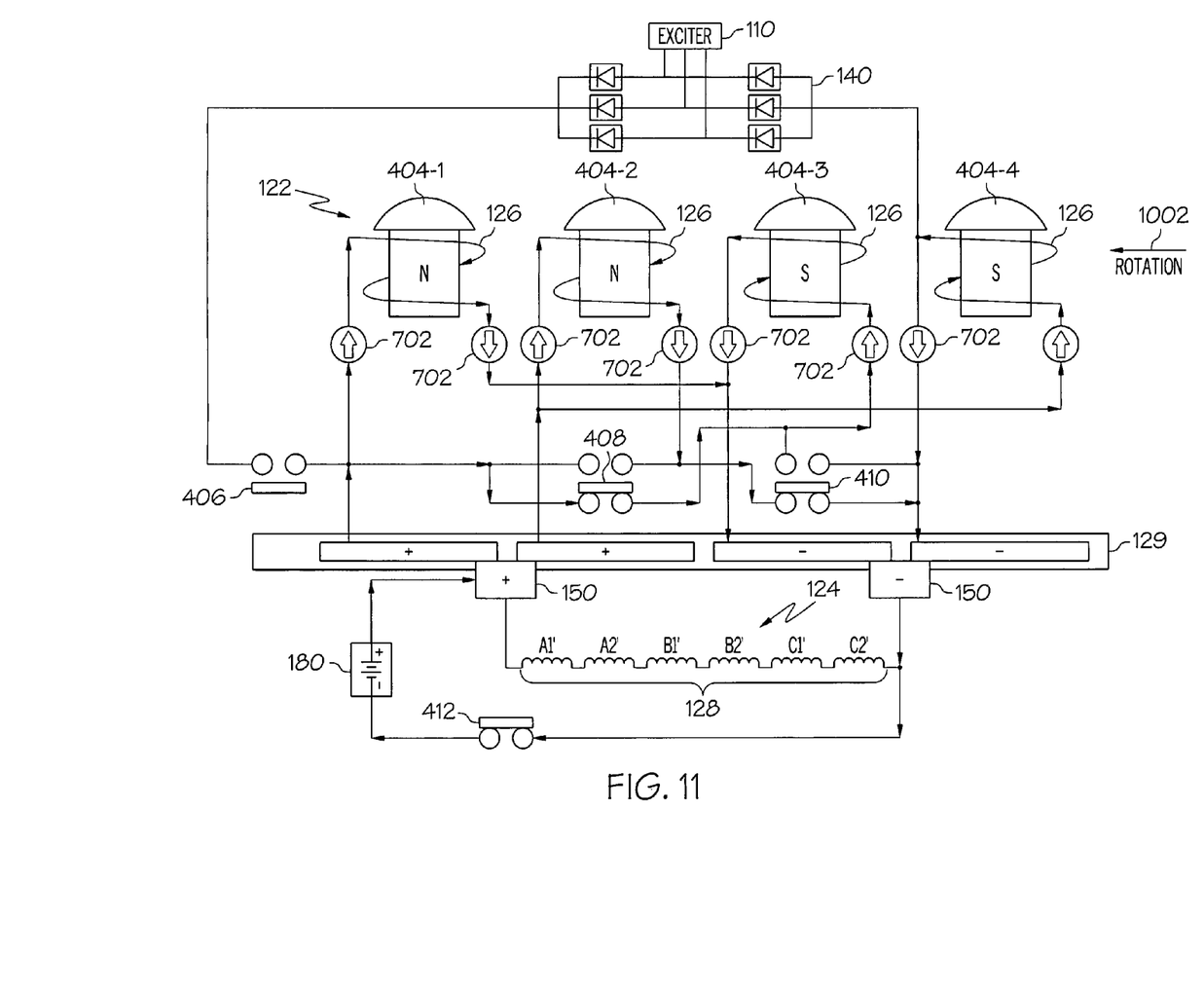
Figure 12:
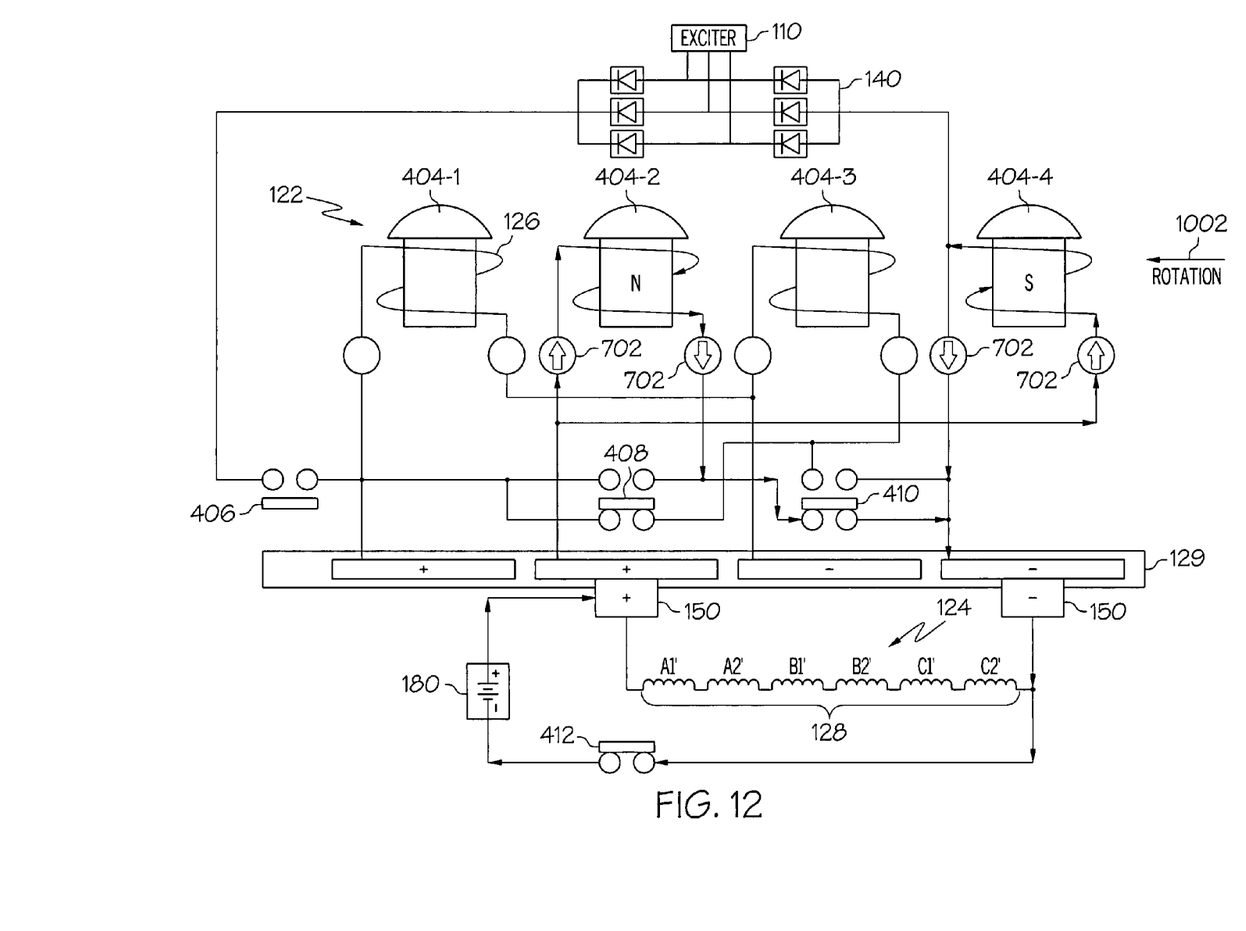

With the rotor 122 and stator 124 configured as described above, DC current from the DC power source 180 flows through the stator windings 128 and, as shown in FIG. 8, induces a single magnetic pole pair in the stator 124. Thus, when commutated current flows through the rotor windings 126, the rotor 122 will be rotated, as shown in FIGS. 10-12 using rotation arrow 1002, and supply rotational power to the gas turbine engine 170 or other mechanical load. In FIGS. 10-12 the depicted rotor circuit corresponds to three different contact positions between the brushes 150 and the commutator 129 during rotor 122 rotation. It will be appreciated that although FIG. 11 shows all of the rotor windings 126 simultaneously excited, the rotor windings 126 still generate the desired pole pair flux pattern for the motor mode, in contrast to the pole pair flux pattern generated by the simultaneously excited rotor windings 126, as shown in FIG. 7, for the generate mode.

Typically, when the motor/generator system 100 is being implemented as an aircraft starter-generator, the aircraft is on the ground and the starter-generator is initially operated in the motor mode. Thus, the stator switches 310-318 and the rotor switches 406-412 are all moved to the second position (2), and the brushes 150 are moved into contact with the main rotor 122. As a result, the main stator 124 is configured as a 2-pole DC stator, the rectifier assemblies 140 are electrically disconnected from the rotor windings 126, and the DC power source 180 supplies DC excitation power to the stator windings 128 and to the rotor windings 126 (via the brushes 150 and the commutator 129). The flux interaction between the rotor windings 126 and the stator windings 128, and the commutation provided by the DC brushes 150 and commutator 129, gives rise to rotor 122 rotation.

When the rotational speed of the rotor 122 reaches a predetermined magnitude and is increasing, the motor/generator system 100 switches to operation in the generator mode. Hence, the switch control logic 186 automatically moves the stator switches 310-318 and the rotor switches 406-412 to the first position (1), and the brush control logic 184 causes the actuators 182 to move the brushes 150 out of contact with the commutator 129. As a result, the main stator 124 is configured as a 4-pole AC stator, the rectifier assemblies 140 are electrically coupled to the rotor windings 126, and the AC power output from the exciter stator 112 is rectified by the rectifiers 140 and supplied to the rotor windings 126.

It will be appreciated that the predetermined rotational speed at which motor/generator operation switches from the motor mode to the generate mode may vary, depending on the type of engine that is being started. The predetermined rotational speed is preferably based on the torque-speed profile of the particular prime mover 170 that is used, so that the motor/generator system 100 can be switched to operation as a generator when the prime mover 170 can supply sufficient torque to rotate the rotor 122. It will additionally be appreciated that this is only exemplary of a particular preferred embodiment, and that the motor/generator 170 could also be switched based on other operational needs, such as, for example, a specified time period after it begins operating in motor mode.

A main motor/generator 120 that is selectively configurable as a multi-pole (e.g., M-pole) DC motor and a multi-pole (e.g., N-pole) AC generator provides additional flexibility over presently known motor/generators. For example, with a selectively configurable main motor/generator, the motor/generator system 100 need not include relatively complex power conversion and frequency control circuits, and can increase time between maintenance of the DC brushes. The selectively configurable main motor/generator disclosed herein also does not rely on a specially wound stator to implement the hybrid functionality, which can also reduce overall costs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine starter-generator, comprising:
   a housing;
   a main rotor rotationally mounted within the housing;
   a main stator mounted within the housing and at least partially surrounding at least a portion of the main rotor, the main stator selectively configurable as an M-pole AC stator and an N-pole DC stator, M and N each integers greater than one;
   two or more brushes adapted to electrically couple to a DC power source and selectively movable into, and out of, electrical contact with at least a portion of the main rotor; and
   one or more stator switches configured to selectively electrically couple the main stator to the DC power source and to at least two of the brushes.

2. The starter-generator of claim 1, further comprising:
   one or more rotor switches configured to selectively electrically couple the main rotor to the DC power source.

3. The starter-generator of claim 2, further comprising:
   an exciter rotor rotationally mounted in the housing and having a plurality of windings wound thereon;
   an exciter stator having a plurality of windings wound thereon, the exciter stator mounted within the housing and located at least partially around at least a portion of the exciter rotor; and
   one or more rectifier assemblies electrically coupled in series between the exciter rotor windings and the main rotor windings, wherein one or more of the rotor switches are configured to selectively electrically couple the main rotor to either the DC power source or the rectifier assemblies.

4. The starter-generator of claim 1, further comprising:
   a plurality of windings wound on at least a portion of the main stator, wherein:
   each of the stator switches has at least a first position and a second position, and
   the main stator is configured as the M-pole AC stator with the plurality of switches in the first position, and is configured as the N-pole DC stator with plurality of switches in the second position.

5. The starter-generator of claim 4, further comprising:
   switch control circuitry operable to move the plurality of stator switches between at least the first position and the second position.

6. The starter-generator of claim 1, wherein M is unequal to N.

7. The starter-generator of claim 6, wherein N=(M/2).

8. A gas turbine engine starter-generator, comprising:
   a housing;
   a main rotor rotationally mounted within the housing;
   a main stator mounted within the housing and at least partially surrounding at least a portion of the main rotor, the main stator selectively configurable as an M-pole AC stator and an N-pole DC stator, M and N each integers greater than one;
   two or more brushes adapted to electrically couple to a DC power source and selectively movable into, and out of, electrical contact with at least a portion of the main rotor;
   one or more stator switches configured to selectively electrically couple the main stator to the DC power source and to at least two of the brushes; and
   one or more rotor switches configured to selectively electrically couple the main rotor to the DC power source.

9. The starter-generator of claim 8, further comprising:
   an exciter rotor rotationally mounted in the housing and having a plurality of windings wound thereon;
   an exciter stator having a plurality of windings wound thereon, the exciter stator mounted within the housing and located at least partially around at least a portion of the exciter rotor; and one or more rectifier assemblies electrically coupled in series between the exciter rotor windings and the main rotor windings, wherein one or more of the rotor switches are configured to selectively electrically couple the main rotor to either the DC power source or the rectifier assemblies.

10. The starter-generator of claim 8, further comprising:

a plurality of windings wound on at least a portion of the main stator, wherein:

each of the stator switches has at least a first position and a second position, and the main stator is configured as the M-pole AC stator with the plurality of switches in the first position, and is configured as the N-pole DC stator with plurality of switches in the second position.

11. The starter-generator of claim 8, further comprising:

switch control circuitry operable to move the plurality of stator switches and rotor switches.

12. The starter-generator of claim 8, wherein M is unequal to N.

13. The starter-generator of claim 12, wherein N=(M/2).

* * * * *